Dec. 1, 1959 E. W. CLARK ET AL 2,915,360
RECORDER CHART DRIVING MECHANISM
Filed Nov. 30, 1955
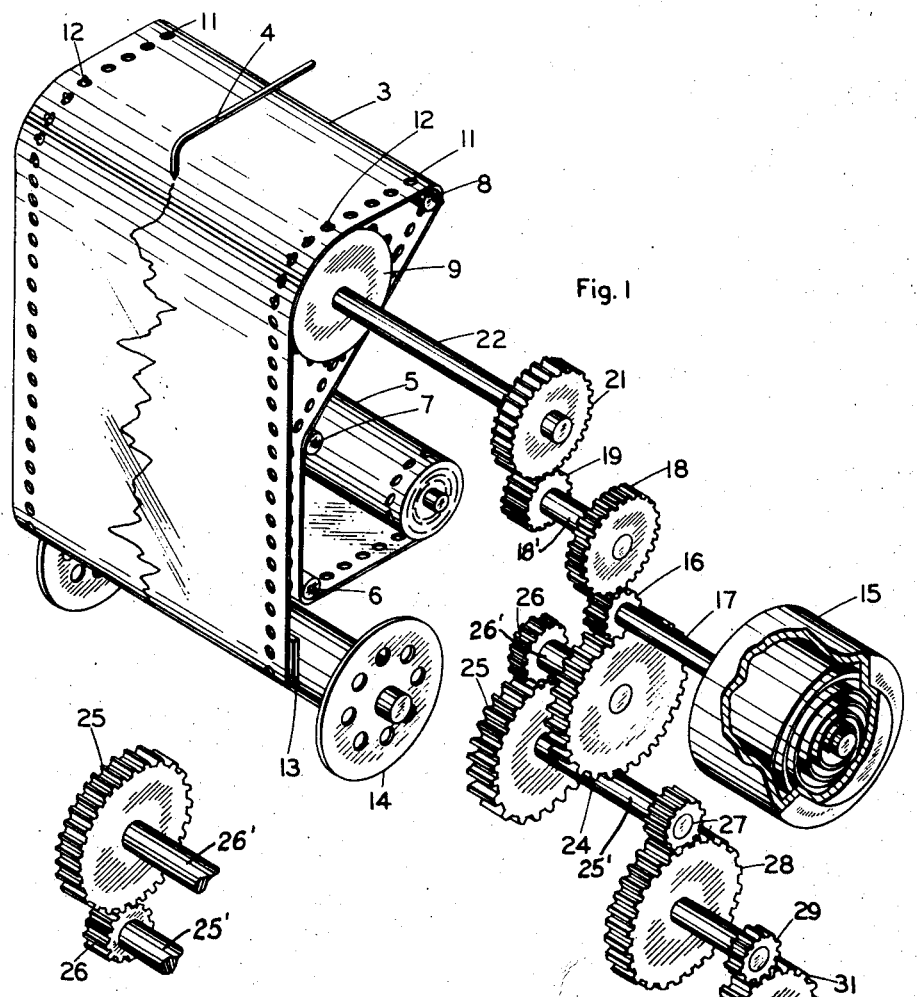
Fig. 1
Fig. 2
Fig. 3
ESCAPEMENT
Inventors:
Harry E. Albright
Earl W. Clark
by, *Richard E. Horley*
Their Attorney

United States Patent Office 2,915,360
Patented Dec. 1, 1959

2,915,360

RECORDER CHART DRIVING MECHANISM

Earl W. Clark, East Lynn, and Harry E. Albright, Marblehead, Mass., assignors to General Electric Company, a corporation of New York Application November 30, 1955, Serial No. 549,945

2 Claims. (Cl. 346—136)

This invention relates generally to improvements in chart driving mechanisms for recording apparatus and in particular relates to an improved spring driven chart driving mechanism for such apparatus.

Heretofore, it has been common practice in the recorder art to provide spring motors for furnishing power to a chart driving mechanism, particularly in those instances where the associated recorder is a portable device. By providing a constant speed escapement with such motors, the spring motor functions as a timing unit as well as a drive unit, and the rate of travel of the chart through the recorder may be precisely regulated, as desired. With such an arrangement, the energy initially stored in the spring motor is released by the escapement mechanism at a constant rate, making available to the chart driving components a constant speed motor which can be utilized in a known manner to provide a range in chart speeds. That is, control of chart speed may be achieved through appropriate selection of gear ratios in the gear train coupling the motor to the chart driving components, whereby the recorder can be selectively adjusted to provide chart speeds covering a suitable range in inches per hour of chart travel.

Theoretically, the permissive range in chart speeds should be substantially unlimited, through appropriate selection of different combinations of gear ratios in the gear train coupling the motor to the chart driving components. Practically, though, there is a definite limit to the range of chart speeds available in such apparatus, in that the escapement mechanisms associated with the spring motors cannot function accurately through an unlimited range in chart speeds.

Unfortunately, the accuracy of an escapement mechanism is a function of the range in torque applied thereto, and it has been found that this range is not much in excess of 12 to 1 for escapement mechanisms usually associated with recording apparatus. Since the escapement mechanism and the chart speed change-gears are both directly coupled to the spring motor, the range in torque applied to the escapement mechanism is directly proportional to the range in chart speeds and it is thus obvious that the chart speed range may not exceed 12 to 1 without materially affecting the accuracy of the escapement mechanism. For this reason, most strip chart recorders heretofore used were limited to a 12 to 1 range in chart speeds when driven by an escapement regulated spring motor, and in many recorders this meant a range extending from one-half inch per hour to six inches per hour.

Of course, such recorders could be operated through a range in chart speed exceeding the limit of its associated escapement mechanism, but in the event of such operation, the record produced by the recording apparatus could not be relied upon to show the precise instant at which changes occurred in the quantity being recorded. Moreover, the additional loading imposed on the escapement mechanism by such extended speed ranges would inevitably have a deleterious effect on the delicate mechanical components of the escapement.

In a like manner, extended speed ranges could be obtained by decoupling the escapement mechanism and controlling the rate of the spring motor by means of a suitable governor coupled to the motor in place of the escapement mechanism. Since governors cannot be relied upon to perform an accurate timing function, here again the record produced by such operation could not be relied upon to show the precise instant at which changes occurred in the quantity being recorded.

Some attempts have been made to extend the permissive chart speed range in such recorders by using an escapement mechanism capable of accurate performance over a range in torque exceeding 12 to 1. However, such escapement mechanisms have resulted in but a limited extension of the range in chart speeds, that is, the range in torque has been extended to as high as about 30 to 1, thereby extending the permissive speed range to about 30 to 1—an improvement over the existing range of 12 to 1, but certainly not an unlimited extension.

Thus, it has been possible to extend the chart speed range somewhat, through the use of improved escapement mechanisms, but this range is still short of the present demands in such equipment in view of the ever increasing use of recording apparatus in measuring and recording the magnitude of both slowly and rapidly changing quantities over limited or extended periods of time.

Coexistent with the problem of limited speed ranges is the further limitation heretofore present in prior recorders on the time available for continuous operation of the recorder before it is necessary to rewind the spring motor. Most prior recorders have used an eight-day escapement mechanism, which required rewinding of the spring motor every eight days and resulted in several rewinding operations to produce a continuous record on a single chart when the recorder was set for slow rates of chart travel. For example, in the case of a strip chart having a length of 100 feet and traveling at the rate of one inch per hour, the chart roll will last approximately 50 days, but the spring motor will have to be rewound six times to maintain continuous operation of the recorder. This problem is further complicated if the chart is lengthened to 150 feet, for in such case, the chart roll will last approximately 74 days, requiring the spring motor to be rewound nine times to maintain continuous operation of the recorder. Recorder users have long recognized this limitation of conventional eight-day spring drive units and attempts have been made to lengthen the recording time before rewinding by storing more energy in the spring to provide more than an eight-day operating period. However, such longer period spring motors have not been too successful in view of their substantially greater range of output torque between the fully wound and unwound condition of the record roll. This increased range in output torque makes it more difficult to maintain proper tension on the chart, and, in addition, aggravates the torque conditions occurring at the escapement.

Therefore, it is a primary object of the invention to provide an improved chart driving mechanism in a recorder having a spring driven motor as a part of its chart driving components.

It is another object of the invention to provide an increase in the range of chart speeds in a recorder having a spring driven escapement regulated motor for driving the chart moving components.

It is yet another object of the invention to provide an increase in the range of chart speeds in a recorder and at the same time extend the operating cycle of the spring driven motor used for driving the chart moving components.

It is a further object of the invention to extend the range in chart speeds and to lengthen the operating cycle of a recorder whose chart moving components are powered by a spring driven escapement regulated motor.

It is a still further object of the invention to provide a spring driven escapement regulated motor as the power source for a chart driving mechanism in a recorder wherein the motor can drive the chart continuously without being rewound, for the full length of the chart, at most speeds within the range of the recorder.

Briefly, the invention comprises the use of change-gears in the gear train coupling the escapement mechanism to the drive shaft of a spring driven motor used as the power source for the chart driving mechanism in a recorder. These change-gears can be adjusted to obtain different gear ratios between the escapement mechanism and the drive shaft whereby the rate of the drive shaft can be adjusted over a wide range. For example, in one form of the invention, the escapement change-gears may be adjusted to either a fast or a slow rate, thereby causing the drive shaft of the motor to turn either fast or slow in response to the regulating effect of the escapement mechanism. By having the usual adjustable change-gears in the gear train coupling the motor drive shaft with the chart moving mechanism, it is apparent that there will be a range in chart speeds for each setting of the escapement change-gears, thereby extending the overall range in chart speeds. Thus, with this arrangement, it becomes possible to extend the range of chart speeds while at the same time maintaining the range in torque as seen by the escapement mechanism within the limits required for accurate timing of the motor.

Moreover, with the escapement change-gears set for the slow rate, the energy stored in the motor spring will be released over a longer period of time than with the escapement change-gears set for the fast rate, and the recorder will correspondingly operate longer before it is necessary to rewind the motor spring. With the proper arrangement of gear ratios, correlating the desired range in chart speeds with the total length of the chart roll, it is possible to continuously operate the recorder at most speeds for the entire length of the chart without rewinding the motor spring.

The above objects and advantages of the invention, together with other objects and advantages appurtenant thereto, will be more clearly understood upon reference to the detailed description of the invention set forth below, particularly when taken in conjunction with the single sheet of drawings annexed hereto, in which:

Figure 1 is a somewhat schematic view, in perspective, of a recorder embodying the subject invention showing the gear train to the escapement mechanism in one position of operation.

Figure 2 is a partial view of the arrangement shown in Figure 1, showing the change-gear in the gear train to the escapement mechanism in an alternate position of operation, and Figure 3 is a partial view of the arrangement shown in Figure 1, showing the change-gears in the gear train to the timing drum in an alternate position of operation.

Referring now to Figure 1, there is shown in somewhat schematic manner all of the essential components forming the chart driving mechanism for a recorder having a chart 3 in the form of a strip that moves relative to a pen 4 for producing a record thereon. The chart is initially formed into a supply roll 5 which is suitably journalled for rotation within the recorder, after which is passes over a plurality of rotatably mounted guide rollers 6, 7, 8, from which it passes onto a timing drum 9. The edges of the chart have spaced perforations 11 which are intended to cooperate with sprocket-like projections 12 carried on the opposite ends of the timing drum 9. After the chart leaves the drum, it is drawn downwardly through the recorder over and around a flat guide rod 13 and onto a rotatably mounted re-roll spool 14.

All of the aforesaid components are suitably mounted within the main framework of a conventional chart carriage forming a part of a strip chart recorder, the details of which are well understood in the art, further explanation thereof being unnecessary in the interests of brevity and clarity. The re-roll spool 14 is driven by any suitable means to maintain tension on the chart as it moves through the recorder, but since the driving means for the re-roll spool forms no part of the invention, it has been omitted for the sake of brevity and clarity.

The timing drum 9 is a part of the chart driving mechanism and the power source for this mechanism is a sturdy, rugged, heavy duty spring motor 15. The motor has a pinion 16 on its driving shaft 17 and is coupled to the timing drum 9 through a suitable gear train comprising the gears 18, 19 and 21, the first two gears being affixed to shaft 18' while the last gear being affixed to the driving shaft 22 of the timing drum 9. Thus, the energy stored in the spring driven motor 15 turns the timing drum 9 and thereby moves the chart through the recorder at a controlled chart speed, as desired. The spring driven motor 15 may have a suitable winding stem attached thereto for initially winding the spring to store energy in the motor.

By suitable selection of gear ratios in the gear train, from the drive shaft to the timing drum, and by a suitable selection of the total number of gears comprising this gear train, and further by making certain of the gears adjustable or interchangeable for the purpose of changing the overall gear ratio of the gear train, it is readily apparent that the timing drum may be regulated to rotate at controlled rates of speed within the limitations of the gear train arrangement. For example, gears 19 and 21 may be made interchangeable in order to secure a second timing drum speed. As shown in Figure 3, gear 19 may be shifted to shaft 22 and gear 21 may be shifted to shaft 18'. Such an arrangement will result in an increased timing drum speed. In prior recorders, the gear train coupling the motor with the timing drum has been arranged to provide a chart speed varying through the range of ½ inch per hour to 6 inches per hour, thereby resulting in an overall speed range on the order of 12 to 1 between the slowest and fastest chart speed.

To control the speed of the spring driven motor 15, there is provided a suitable escapement mechanism 23 indicated but generally on the drawing and comprising a conventional escapement mechanism well understood in the art, the details of which form no part of the subject invention, being omitted in the interests of brevity and clarity. The escapement mechanism 23 functions in the known manner to release the energy stored in the motor at a controlled rate to thereby provide a constant speed at the drive shaft 17. The escapement mechanism is coupled to the drive shaft of the motor by means of a suitable gear train comprising the gear 24 meshing with pinion 16, a pair of change gears 25, 26 and two additional pairs of gears 27, 28 and 29, 31 coupled between the change-gears and the escapement mechanism. Change gear 25 is shown in Figure 1 as affixed to shaft 25' while change gear 26 is affixed to shaft 26'. Referring to Figure 2, the change gears 25 and 26 are shown interchanged. Gear 25 is now affixed to shaft 26' while gear 26 is affixed to shaft 25'.

Since the gear train coupling the escapement to the motor is also directly driven by the pinion 16, it is apparent that the torque transmitted to the escapement mechanism varies through a range proportional to the range in chart speeds available to the timing drum. Under such circumstances, when the gear train to the timing drum is adjusted for slow chart speeds, more of the torque available at the drive shaft must be absorbed by the escapement mechanism than when the gear train to the timing drum is set for fast chart speeds. It has been found that a range of 12 to 1 in the torque transmitted to the escapement mechanism is the practical limit for most escapement mechanisms usually associated with strip chart recorders, and, further, it has been found that any range in torque exceeding the aforesaid range has deleterious effects on the timing accuracy provided by such escapement mechanisms.

Some attempts have been made to improve the escapement mechanism normally associated with chart recorders by increasing their permissive range of torque from approximately 12 to 1 to as high as about 30 to 1, and under such circumstances it follows that the range in chart speeds is also increased in a corresponding manner. However, even with improved escapement mechanisms that are capable of responding accurately to increased ranges in torque, there are still limits to the applied torque range, which impose limits on the range in speed available to the timing drum.

To overcome this fundamental defect in the class of recorders under consideration, the gear pair 25, 26 have been made interchangeable to thereby change the overall gear ratio in the gear train between the motor and the escapement mechanism. It is apparent that such rearrangement of the gear pair 25, 26 changes the speed of the drive shaft 17 and changes to a new level the torque transmitted to the escapement mechanism and to the timing drum. The drive shaft will thus have two constant speeds, selectively adjusted by interchanging the gear pair 25, 26 and these two speeds will, of course, give two independent ranges in chart speeds, each of which being regulated by the adjustment of the gear train coupling the motor to the timing drum. Additional change gears may be provided in the gear train to the escapement mechanism so that any number of desired speeds can be provided for the driving shaft of the motor.

A more complete understanding of the effects of changing the relative positions of gears 25, 26 will be apparent upon consideration of a chart driving mechanism embodying the invention and arranged to provide the following chart speeds, all in inches per hour: ¼, ⅓, ½, 1, 2, 3, 4, 7.5, 10, 15 and 30. It is to be noted that the overall speed range is 120 to 1, a tenfold gain over most existing recorders embodying spring driven motors for driving the chart moving components.

In one setting of the gears 25, 26, the aforesaid arrangement will provide a range in chart speeds, in inches per hour, from ¼ to 4. The alternate setting of these gears provides the remainder of the overall range, in inches per hour, from 7.5 to 30.

In considering the operation of such a recorder, assume that both gear trains are set for a chart speed of ¼ inch per hour. At this setting, minimum torque is transmitted from the motor to the timing drum and maximum torque is transmitted from the motor to the escapement mechanism. By rearranging the gear ratios in the gear train coupling the motor to the timing drum, successively increasing chart speeds will be obtained up to a limit of 4 inches per hour. At this setting of the gear trains, the motor torque transmitted to the timing drum will be at a maximum and the motor torque transmitted to the escapement mechanism will be at a minimum. It is to be noted that the overall range in chart speeds for these settings of the gear trains is 16 to 1, a slight improvement over the 12 to 1 ranges in prior recorders, and resulting from the use of an escapement mechanism having a higher range in permissive torque than the escapement mechanisms used with the aforesaid prior recorders.

If any attempt were now made to increase chart speed by further rearrangement of the gear ratios in the gear train coupling the motor to the timing drum, it would be found that there is not sufficient torque available to the escapement mechanism to allow it to function properly. Hence, at a chart speed of 4 inches per hour, the recorder has reached its limit of chart speed. It would do no good to increase the size of the motor to provide additional torque for driving above 4 inches per hour, for the excessive torque transmitted to the escapement mechanism by such a larger motor when set to drive the chart at ¼ inches per hour would exceed the limit of torque that can be properly handled by the escapement mechanism, resulting in inaccurate performance of the recorder.

However, by changing the setting of gears 25, 26, the ratio of the gear train between the motor and the escapement mechanism will be changed on the order of 8 to 1, resulting in an 8 to 1 increase in the speed of the motor drive shaft. The motor torque available at the drive shaft 17 will be increased substantially by the change, permitting the motor to drive the chart at higher speeds, but the range in torque transmitted to the escapement mechanism will remain essentially the same, thereby permitting the escapement mechanism to continue its function as an accurate timing regulator for the motor. In other words, with one setting of the gears 25, 26, the gear ratio between the escapement mechanism and the motor drive shaft will be approximately 100 to 1, whereas, with the alternate setting, the gear ratio will be only 13 to 1. At this alternate setting, the higher driving speed at the motor shaft will produce more power than before, but more of the power will be used to drive the paper, thus allowing the torque imposed on the escapement mechanism to remain within the permissive limits.

If the gears 25, 26 are thus changed when the gear train to the timing drum is set for a chart speed of 4 inches per hour, the new chart speed will be 30 inches per hour. To provide the intermediate chart speeds of 7.5, 10 and 15 inches per hour, the gear train to the timing drum will be adjusted, as aforesaid. Thus, by providing the interchangeable gears 25, 26, the chart speed range has been extended to 120 to 1—a very substantial improvement over recorders heretofore used.

In addition to the substantial extension in the range of chart speeds obtainable with the change gears 25, 26, another important advantage results therefrom, that is, the operating cycle of the motor before rewinding of its spring is much more closely correlated to the time it takes for the entire strip chart to pass through the recorder. For example, when the gears 25, 26 are set for the range in chart speeds of ¼ to 4 inches per hour, the motor will run for sixty days before rewinding of its spring is necessary. Since the record roll will last only 17 days, 24 days and 36 days, respectively, at chart speeds of 4, 3 and 2 inches per hour, respectively, it is apparent that the spring will outlast the record roll. Even at a chart speed of 1 inch per hour, at which the record roll will last 74 days, the spring will very nearly last as long as the chart, requiring only one rewinding to move the chart through its complete length. At speeds of ½ inch per hour and slower, additional rewinding steps are necessary, but since the most popular chart speeds are 1, 2, and 3 inches per hour, it is apparent that the performance of the recorder has been materially improved.

With the change gears 25, 26 set for the chart speed range of 7.5 to 30 inches per hour, the spring motor will last for 7½ days before rewinding is necessary. At speeds of 10, 15 and 30 inches per hour, the record roll will last 7, 5 and 2½ days, respectively, during which intervals no rewinding of the motor spring is necessary. At a speed of 7½ inches per hour, the record roll will last 9 days, making it necessary to rewind but once to enable the motor to move the entire length of the chart through the recorder.

Moreover, if it is desired to have the motor outlast the chart at a speed of 7.5 inches per hour, so as to provide a continuous range of such operation for all chart speeds over 1 inch per hour, a different set of gears could be used in place of the gears 25, 26 to permit the motor shaft to rotate at a speed intermediate the high and low speeds provided with gears 25, 26. Thus, if gears so substituted for 25, 26 permit the motor to run 30 days before rewinding, and the gear ratios between the timing drum and the motor shaft are properly arranged to produce a chart speed of 7.5 inches per hour, it is apparent that the spring motor will outlast the chart by a substantial number of days.

Of added significance in the absence of change gears 25, 26, and even assuming that an escapement mechanism could be devised to accurately handle the range in torque corresponding to a 120 to 1 range in chart speeds, and assuming further that such an escapement mechanism could be devised to provide 60 days of motor operation before rewinding, it has been estimated that the motor would have to be twice the size of the motor required with the change gears 25, 26.

From the above, it is apparent that substantial improvements have been achieved through the use of the change gears 25, 26, resulting in performance not heretofore possible in recorders whose chart driving mechanisms are powered by a spring driven escapement regulated motor.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. Recording strip chart drive apparatus comprising, means for moving the chart at controlled rates of speed, driving means for said chart moving means comprising a spring wound driving motor, first coupling means between said chart moving means and said motor, means for adjusting said first coupling means to produce a first range in chart speeds, escapement means, second coupling means comprising a gear train between said escapement means and said motor whereby said escapement means releases the energy stored in said motor at a controlled rate, means for adjusting the overall gear ratio of said second coupling means whereby the rate of release of energy stored in said motor may be varied to establish a second range in chart speeds, said first and second coupling means being correlated whereby said motor has sufficient energy stored therein to move said chart completely through said recorder at any given chart speed within a predetermined range in chart speeds spanning at least portions of both said first and second ranges.

2. Recording strip chart drive apparatus comprising, means for selectively moving the chart at controlled rates of speed, driving means for said chart moving means including motor means powered by an energy storing spring member, a first gear train between said chart moving means and said motor means, said first gear train being adjustable whereby its overall gear ratio may be varied to produce a first range in chart speeds, torque responsive escapement means for regulating the rate of release of energy stord in said spring mmber to control the speed of said motor means, said escapement means being capable of uniformly consistent operation within a limited range of torque applied thereto, a second gear train between said escapement means and said motor means, said second gear train being adjustable whereby its overall gear ratio may be varied to produce a second range in chart speeds, said torque applied to said escapement means being maintained within said limited range upon adjustment of said second gear train, said energy storing spring member operating to release its energy at different rates upon adjustment of said second gear train, said overall gear ratios of said first and second gear trains being correlated whereby said energy storing spring member will have sufficient energy stored therein to move said chart completely through said recorder at any given chart speed within a predetermined range in chart speeds spanning at least portions of both said first and second ranges.

References Cited in the file of this patent

UNITED STATES PATENTS

| | | |
|---|---|---|
| 436,583 | Lane | Sept. 16, 1890 |
| 1,074,204 | Rikard | Sept. 30, 1913 |
| 2,153,317 | Sigo | Apr. 4, 1939 |
| 2,543,032 | Laviana | Feb. 27, 1951 |
| 2,661,815 | McGay | Dec. 8, 1953 |

FOREIGN PATENTS

| | | |
|---|---|---|
| 164,443 | Great Britain | June 1, 1921 |